(12) United States Patent
Sakai et al.

(10) Patent No.: US 7,121,119 B2
(45) Date of Patent: Oct. 17, 2006

(54) PRESS MOLDING APPARATUS FOR AN OPTICAL ELEMENT AND METHOD OF MANUFACTURING THE OPTICAL ELEMENT

(75) Inventors: Hiroyuki Sakai, Tokyo (JP); Shinichiro Hara, Koganei (JP); Tadayuki Fujimoto, Hachioji (JP); Shinji Hada, Higashimurayama (JP); Shinichiro Hirota, Fuchu (JP)

(73) Assignee: Hoya Corporation, Tokyo (JP)

( * ) Notice: Subject to any disclaimer, the term of this patent is extended or adjusted under 35 U.S.C. 154(b) by 522 days.

(21) Appl. No.: 10/254,855

(22) Filed: Sep. 26, 2002

(65) Prior Publication Data

US 2003/0066312 A1 Apr. 10, 2003

(30) Foreign Application Priority Data

Sep. 28, 2001 (JP) ............................. 2001-300638

(51) Int. Cl.
*C03B 11/12* (2006.01)

(52) U.S. Cl. ............................. 65/102; 65/25.1; 65/122; 65/182.2; 65/319; 65/323; 65/355; 264/1.21; 264/1.32; 264/2.5; 425/397; 425/400

(58) Field of Classification Search ................ 65/25.1, 65/64, 102, 122, 182.2, 319, 323, 355; 264/1.21, 264/1.32, 2.5; 425/397, 400
See application file for complete search history.

(56) References Cited

U.S. PATENT DOCUMENTS 4,065,286 A * 12/1977 Becker ......................... 65/229
4,580,964 A * 4/1986 Repella ........................ 425/124
5,762,673 A * 6/1998 Hirota et al. ................. 65/25.1
5,788,732 A * 8/1998 Nomura et al. ................ 65/64
6,098,427 A * 8/2000 Kirkman ....................... 65/261
6,141,991 A * 11/2000 Fujimoto et al. ........... 65/29.19
6,370,915 B1 * 4/2002 Fujimoto et al. ............. 65/25.1

FOREIGN PATENT DOCUMENTS

| JP | 5-97448 | | 4/1993 |
| JP | 06-340430 | * | 12/1994 |
| JP | 08-259242 | * | 10/1996 |
| JP | 9-2825 | | 1/1997 |
| JP | 11-29333 | | 2/1999 |
| JP | 2001-10829 | | 1/2001 |

OTHER PUBLICATIONS

Machine translation of JP 05-97448.*

* cited by examiner

*Primary Examiner*—Sean Vincent
(74) *Attorney, Agent, or Firm*—Sughrue Mion, PLLC (57) ABSTRACT

A transfer arm holds a plurality of preforms arranged in a single line and simultaneously drops and supplies the preforms downward. A positioning arm has a pair of arm split members split in its widthwise direction. The arm split members have positioning surfaces formed on their contact surfaces to be brought into contact with outer peripheries of the preforms. After the preforms are dropped and supplied from the transfer arm, the arm split members of the positioning arm are opened and closed so that the positioning surfaces are brought into contact with the outer peripheries of the preforms. Thus, the performs are properly positioned.

24 Claims, 6 Drawing Sheets

PRESS MOLDING APPARATUS FOR AN OPTICAL ELEMENT AND METHOD OF MANUFACTURING THE OPTICAL ELEMENT

BACKGROUND OF THE INVENTION

This invention relates to a press-molding apparatus for obtaining an optical element having a predetermined shape by press-molding a preformed glass material after it is heated and softened, and a method of manufacturing the same.

Recently, in a field of production of an optical element such as an optical lens, it is desired to obtain a high-accuracy lens shape without carrying out surface polishing. To this end, proposal has been made of a method comprising the steps of preparing a pre-shaped glass material as a preform, heating and softening the preform, and pressing the preform by the use of a pressing mold having a high-accuracy pressing surface (Japanese Unexamined Patent Publication JP 2001-10829 A).

Figure 1:
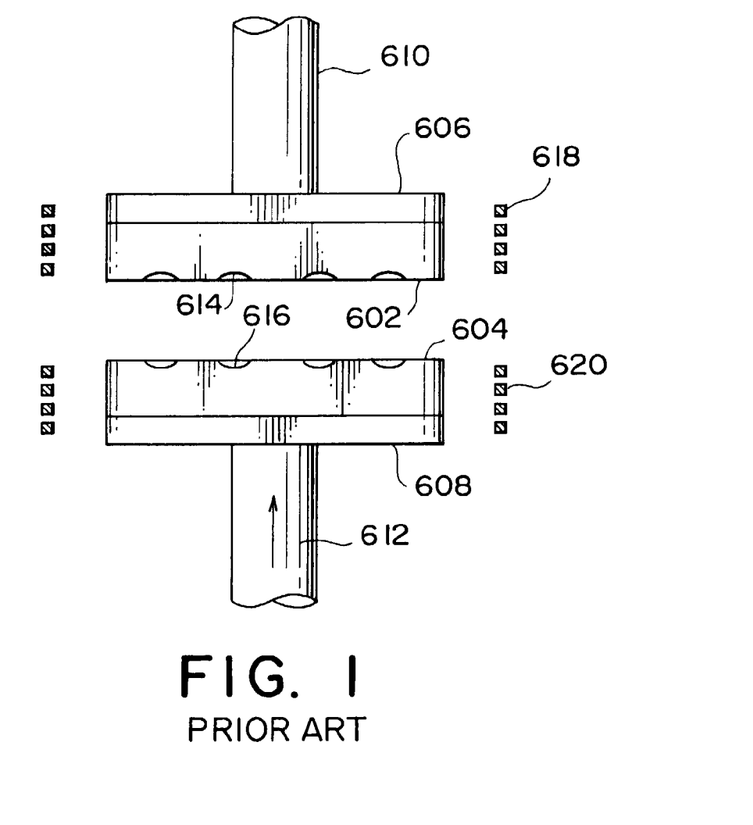
FIG. 1 is a diagram showing a basic structure of a conventional press-molding apparatus.

Referring to FIG. 1, description will be made of a basic structure of a press-molding apparatus for use in pressing of the type described.

In the press-molding apparatus illustrated in FIG. 1, a plurality of (for example, four) preforms are simultaneously pressed by an upper mold 602 and a lower mold 604. Each of the upper mold 602 and the lower mold 604 has an elongated shape extending in a transversal or horizontal direction in the figure. The upper mold 602 and the lower mold 604 have a plurality of molding surfaces 614 and 616 formed on confronting surfaces thereof and arranged in a single line, respectively, to provide preforms with a lens shape. The upper mold 602 and the lower mold 604 are fixed to a pair of upper and lower supporting shafts 610 and 612 via supporting members 606 and 608, respectively.

The upper supporting shaft 610 is fixed to an apparatus frame (not shown) while the lower supporting shaft 612 is driven by a driving mechanism in a vertical direction. The upper mold 602 and the lower mold 604 are surrounded by heating coils 618 and 620 for heating the upper and the lower molds 602 and 604 by high-frequency induction heating, respectively. Between the upper mold 602 and the lower mold 604, the preforms are supplied after heated and softened to a viscosity between $10^{5.5}$ and $10^9$ poises. The preforms in the softened state is clamped and pressed by the upper mold 602 and the lower mold 604 so that high-accuracy processed surfaces are formed on the preforms.

As a method of producing a plurality of optical elements by press molding a plurality of preforms by a plurality of molding surfaces as described above, disclosure is made of a method in which a plurality of preforms are simultaneously dropped and supplied onto a plurality of molding surfaces of a pressing mold (Japanese Unexamined Patent Publication JP 11-29333 A). However, if a plurality of preforms are dropped and supplied onto the molding surfaces, each of the preforms may not be exactly supplied on the center of the molding surface. If the preform is press-molded in such a state, thickness deviation may be caused.

Figure 2:
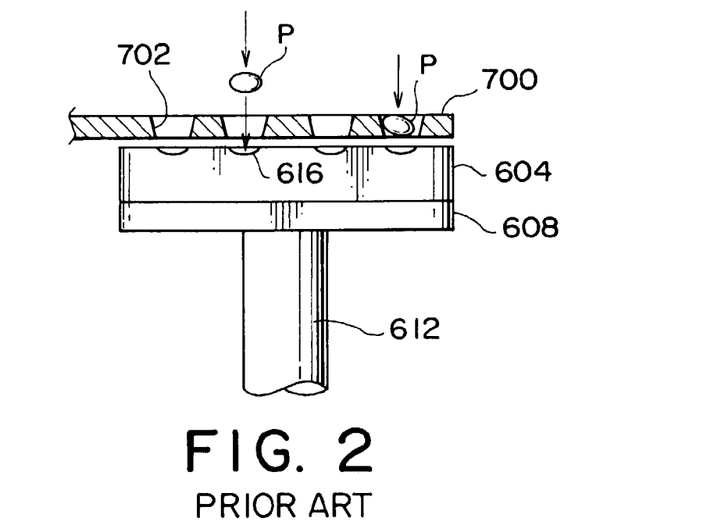
FIG. 2 is a diagram showing a basic structure of a conventional positioning apparatus.

In order to solve the above-mentioned problem, proposal has been made of guide means for guiding each preform during dropping to supply the preform on the center of each molding surface as exactly as possible (Japanese Unexamined Patent Publication JP 11-29333 mentioned above). As illustrated in FIG. 2, a positioning arm 700 as the guide means is extended in a horizontal direction and is provided with through holes 702 having a funnel-like shape (i.e., an upper part has a greater inner diameter) and arranged in a single line.

The positioning arm 700 is placed on the upper side of the lower mold 604 and serves to guide the preforms (depicted by the reference symbol P in the figure), which are dropped and supplied from an upper position by a transfer apparatus (not shown), onto the molding surfaces 616 through the through holes 702. By the positioning arm 700, the preforms P can be guided to the molding surfaces 616, respectively, without jumping out from the molding surfaces 616.

In the positioning arm illustrated in FIG. 2, however, the preform P may be inclined during dropping through the through hole 702 depending upon the shape or the surface condition of the preform P. In this event, the preform is deviated from the center of the molding surface 616. If the press-molding is carried out in such a state that the preform is deviated in position, the thickness deviation is caused and the surface accuracy is degraded.

In the meantime, Japanese Unexamined Patent Publications JP 9-2825 A and JP 5-97448 A disclose a structure in which a positioning mechanism comprising a large number of lever-like movable members for clamping and positioning a plurality of materials, respectively, is attached to the pressing mold (lower mold). In such a structure that the positioning mechanism is attached to the pressing mold, however, a temperature elevation rate of the pressing mold is lowered because heat capacity of the pressing mold is increased because of presence of the positioning mechanism. In addition, if the positioning mechanism is repeatedly subjected to heating and cooling cycles in the manner similar to the pressing mold, the positioning mechanism tends to be deformed so that the positioning accuracy is lowered.

In a method of press-molding a plurality of preforms introduced into the pressing mold after the preforms are heated and softened to a temperature higher than that of the pressing mold, it is required to simultaneously supply a plurality of preforms into the pressing mold and to simultaneously press mold the preforms so that the preforms are press-molded under the same molding conditions.

In the method disclosed in Japanese Unexamined Patent Publication JP 9-2825 A, a plurality of preforms may be simultaneously corrected in position. However, this publication does not disclose whether or not a plurality of preforms can be simultaneously supplied to the pressing mold and simultaneously press molded.

SUMMARY OF THE INVENTION

It is therefore an object of this invention to provide a press-molding apparatus and a method of producing an optical element which are capable of press-molding a plurality of materials to obtain a plurality of optical elements excellent in surface accuracy.

According to this invention, there is provided a press-molding apparatus for obtaining a plurality of optical elements by simultaneously press molding a plurality of materials in a heated and softened state comprising:

an upper mold and a lower mold, each of the upper mold and the lower mold comprising a plurality of molding surfaces arranged so that the centers of the molding surfaces on each of the upper and the lower molds are aligned in a single line;

a supply unit for supplying the materials onto the molding surfaces of the lower mold; and a position correcting unit for correcting the positions of the materials supplied onto the molding surfaces of the lower mold;

wherein the position correcting unit comprises a pair of split members adapted to be opened and closed in parallel to and symmetrically with each other, so that a plurality of positioning surfaces formed on confronting surface on each of the split members be brought into contact with outer peripheries of the materials on the lower mold and move the materials towards the centers of the molding surfaces, when the split members are closing.

Herein, the molding surface can be a molding surface of a preheated pressing mold. The upper mold may be an integral upper mold provided with a plurality of molding surfaces or may comprise a combination of a plurality of upper pressing molds and an upper mother mold holding the upper pressing molds. This also applies to the lower mold.

Preferably, the supply unit comprises a plurality of holding portions for holding the materials. The holding portions are arranged in a single line and are split along the single line to simultaneously drop the materials held by the holding portions so that the each material is supplied onto each molding surface of the lower mold.

Preferably, the holding portions have a structure in which the materials are floated by gas on the holding portions and are dropped onto the molding surfaces when the holding portions are split along the single line.

Preferably, the press molding apparatus further comprises a heater for preheating the position correcting unit.

Preferably, the position correcting unit is adapted to move from a preheating position where the unit is preheated by the heater to an operating position above the molding surfaces where the unit is operated to correct the positions of the materials.

According to this invention, there is also provided a method of manufacturing a plurality of optical elements by simultaneously press molding a plurality of materials in a heated and softened state by a plurality of preheated molding surfaces, the method comprising the steps of:

simultaneously supplying each of the plurality of materials heated and softened onto the each molding surface;

simultaneously correcting the position of each material supplied onto each molding surface by moving the each material towards center of the each molding surface; and simultaneously press molding the each material with the each molding surface.

Preferably, the correcting step is carried out by a pair of split members of a position correcting unit which are adapted to be opened and closed in parallel to and symmetrically with each other, so that the each positioning surface formed on confronting surface on the each split member be brought into contact with the outer periphery of each material and move the each material toward the center of each molding surface when the split members are closing.

Preferably, each of the heated and softened material is a glass material and is supplied onto the each molding surface after the material is heated to a temperature higher than that of the preheated molding surface.

Preferably, the each material is supplied onto the each molding surface by dropping.

Preferably, the each glass material is heated and softened to a viscosity smaller than $10^9$ poises.

Preferably, the each material is a preform having a spherical shape or a flat spherical shape.

Preferably, the each positioning surface is preheated to a predetermined temperature.

Preferably, the position correcting unit is retreated from an operating position above the molding surfaces where the correcting is carried out to the preheating position after the correcting and prior to the correcting of the next supplied materials.

Preferably, the molding surfaces are arranged in a single straight line on each of upper and lower mold.

Preferably, the molding surfaces are arranged in a single straight line. Each of the heated and softened materials is a glass material and is supplied onto the molding surface after the material is heated to a temperature higher than that of the preheated molding surface.

Other objects of this invention will become clear as the description proceeds.

DESCRIPTION OF THE PREFERRED EMBODIMENTS

Now, a preferred embodiment of this invention will be described in detail with reference to the drawings.

Figure 3:
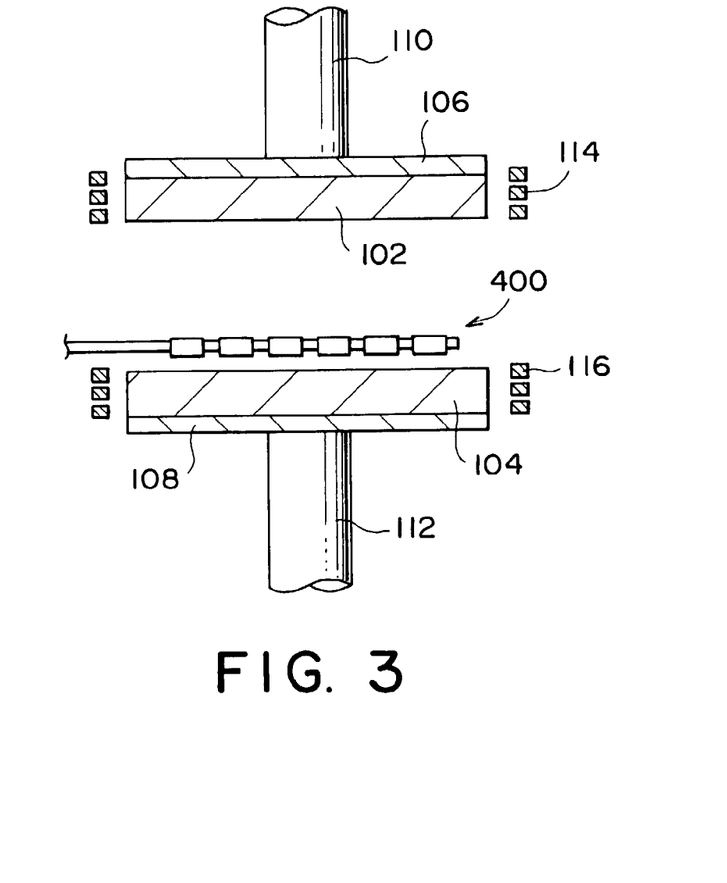
FIG. 3 is a sectional view showing a characteristic part of a press-molding apparatus with a positioning apparatus according to an embodiment of this invention.

Referring to FIG. 3, description will be made about a press-molding apparatus with a positioning apparatus for positioning a material according to an embodiment of this invention.

The press-molding apparatus is used to mold a medium-aperture lens, for example, having a diameter of 17 mm by the use of a preform as a material prepared by preliminarily molding a glass material into a flat spherical shape.

The press-molding apparatus has an upper mold 102 and a lower mold 104 for pressing the preform. Each of the upper mold 102 and the lower mold 104 is made of, for example, a tungsten alloy, and has an elongated shape extending in a transversal or horizontal direction in the figure.

The upper mold 102 and the lower mold 104 have a plurality of molding surfaces (which will be described later) formed on confronting surfaces thereof to provide a plurality of preforms with a predetermined shape. The upper mold 102 and the lower mold 104 are attached to an upper main shaft 110 and a lower main shaft 112 through supporting members 106 and 108 on the sides opposite to the confronting surfaces, respectively. The upper main shaft 110 is fixed to an apparatus frame (not shown) while the lower main shaft 112 is driven in a vertical direction by a motor (not shown). By driving the lower main shaft 112, the upper mold 102 and the lower mold 104 are opened and closed. The upper mold 102 and the lower mold 104 are surrounded by induction heating coils 114 and 116 for heating the upper and the lower molds 102 and 104 by high-frequency induction heating, respectively. Alternatively, the upper mold 102 and the lower mold 104 may be heated by a single common induction heating coil.

Figure 4:
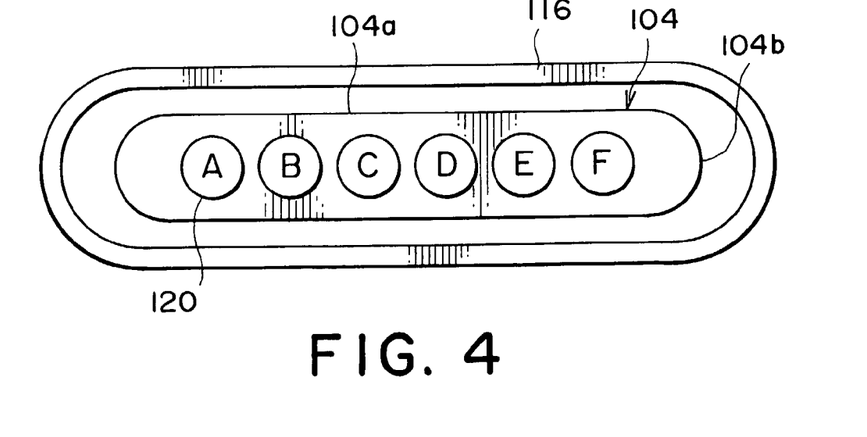
FIG. 4 is a plan view of a lower mold of the press-molding apparatus illustrated in FIG. 3.

Referring to FIG. 4, the lower mold 104 is surrounded by the induction-heating coil 116. The upper mold 102 is similar in shape to the lower mold 104 and, therefore, is not illustrated in the figure. The lower mold 104 has a pair of long sides 104a extending in parallel to each other and a pair of semicircular arc-shaped sides 104b located at opposite ends of the long sides 104a. Each of the semicircular arc-shaped sides 104b defines an arc of a half circle having a radius equal to a half of the distance between the two long sides 104a (i.e., the width of the lower mold 104). The induction heating coil 116 is wound around the lower mold 104 in a shape corresponding to an outer periphery of the lower mold 104.

The lower mold 104 has an upper surface provided with six molding surfaces A, B, C, D, E, and F for imparting a desired lens shape to the preforms. These molding surfaces A to F are arranged in a single line along a longitudinal direction of the lower mold 104. Similarly, the upper mold 102 has six molding surfaces arranged at positions corresponding to the molding surfaces A to F of the lower mold 104, respectively. Hereinafter, the molding surfaces A to F will collectively be referred to as molding surfaces 120.

Figure 5A:
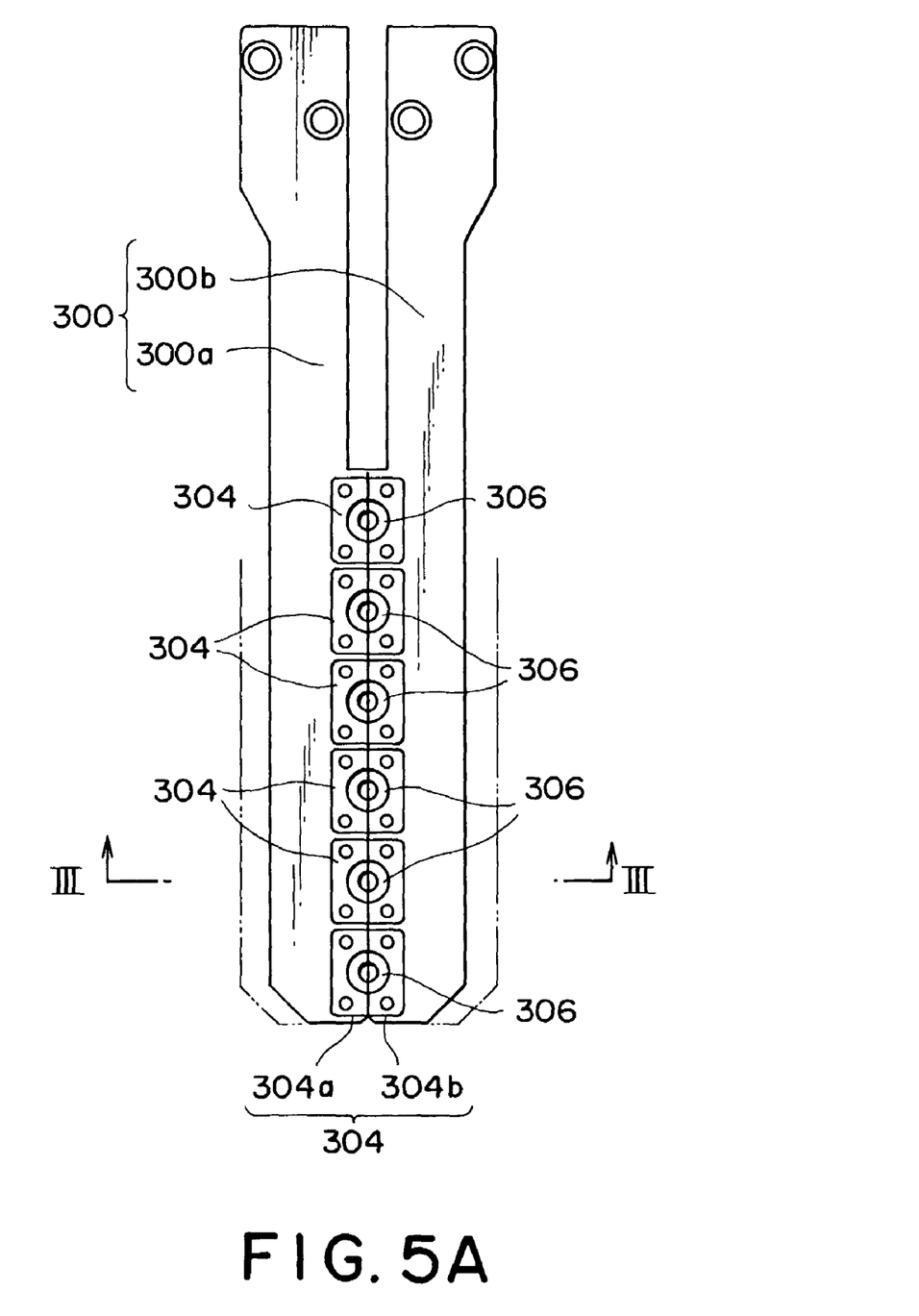
FIG. 5A is a plan view of a transfer arm for supplying preforms to the press-molding apparatus illustrated in FIG. 3.
Figure 5B:
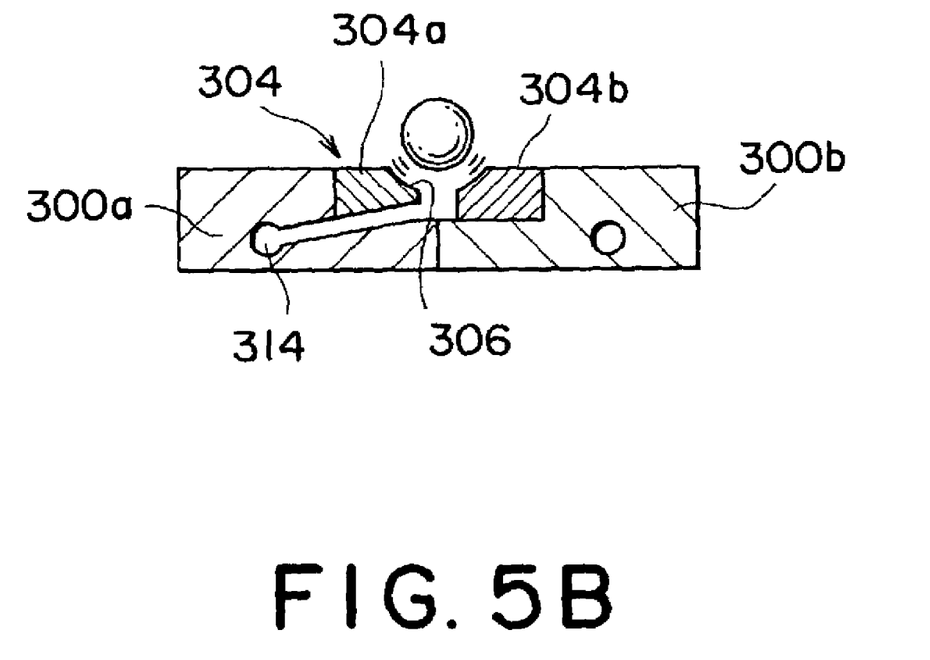
FIG. 5B is a sectional view of the transfer arm illustrated in FIG. 5A.

Referring to FIGS. 5A and 5B, description will be made about a transfer arm 300 for transferring the preforms to the press-molding apparatus illustrated in FIG. 3.

As illustrated in FIG. 5A, the transfer arm 300 is an elongated member of a heat-resistant metal (for example, a stainless alloy), and is provided with six holding blocks 304 arranged in a single line along its longitudinal direction to hold the preforms. Each of the holding blocks 304 has a cone-shaped receiving portion 306. The holding block 304 may be made of a high-density carbon material with a glassy carbon surface.

As illustrated in FIG. 5B, the transfer arm 300 is provided with a gas hole 314 extending in the longitudinal direction of the transfer arm 300. An inactive gas supplied through the gas hole 314 is introduced into each of the receiving portions 306. By the pressure of the gas, the preform is slightly floated in the receiving portion 306 and transferred in the floating state.

The transfer arm 300 is split or separated at a center line in its widthwise direction into two arm members 300a and 300b parallel to each other. When the transfer arm 300 is split into the arm members 300a and 300b, each holding block 304 is also split into two block members 304a and 304b. By splitting the transfer arm 300 and opening the arm members 300a and 300b in parallel to each other as described above, a plurality of heated and softened preforms, which are held on the holding blocks 304 in the floating state, can be simultaneously dropped downward.

Figure 6:
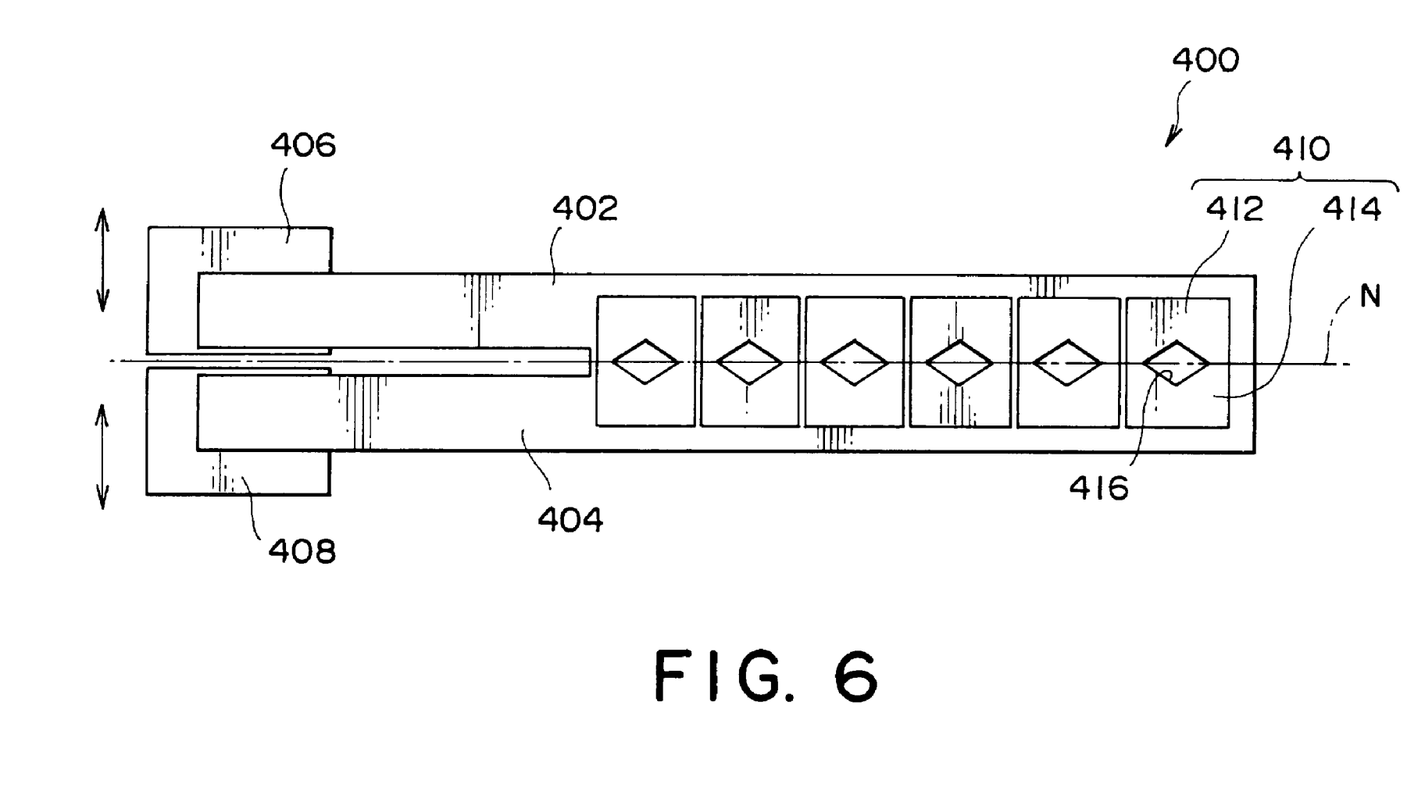
FIG. 6 is a plan view of a positioning arm for positioning the preforms with respect to the lower mold of the press-molding apparatus illustrated in FIG. 3.

Referring to FIG. 6, description will be made about a positioning arm 400 as position correcting unit for positioning the preforms when the transfer arm 300 drops and supplies the preforms onto the lower mold 104.

The positioning arm 400 has an elongated shape and can be split or separated into two arm split members 402 and 404 at a center line N in its widthwise direction. The positioning arm 400 further comprises six positioning blocks 410 arranged along its longitudinal direction to position the preforms. Each of the positioning blocks 410 can be split or separated into two portions 412 and 414 at the center line N of the positioning arm 400 so that the two portions 412 and 414 are opened and closed in parallel to each other in synchronism with opening and closing operations of the arm split members 402 and 404.

Each of the positioning blocks 410 is provided with an opening portion 416 having a diamond or rhombic shape in plan view. The opening portion 416 has a shape such that its inner periphery is brought into contact with the outer periphery of the preform. The arm split members 402 and 404 of the positioning arm 400 have longitudinal one ends (left end in the figure) attached to a pair of sliding members 406 and 408, respectively. The sliding members 406 and 408 are driven by a driving mechanism (not shown) to move towards and away from each other (in the direction depicted by arrows in the figure). Following the above-mentioned movement, the sliding members 406 and 408 are opened and closed in parallel to each other. Specifically, when the sliding members 406 and 408 move away from each other, the arm split members 402 and 404 are opened. On the contrary, when the sliding members 406 and 408 move towards each other, the arm split members 402 and 404 are closed.

The positioning arm 400 is rotatable in a horizontal plane. Driven by a rotating mechanism (not shown), the positioning arm 400 rotates between an operating position above the lower mold 104 and a retreated position (arm preheating position) where the positioning arm 400 is retreated from the operating position above the lower mold 104. The positioning arm 400 is placed at the operating position above the lower mold 104 when the preform s are positioned while it is retreated from the operating position above the lower mold 104 to the retreated position in other occasions. A rotation angle of the positioning arm 400 is detected by a motor pulse, an encoder, or the like. Based on the rotation angle thus detected, rotation control is carried out.

It is noted here that the movement of the positioning arm 400 is not restricted to the rotation but may be horizontal movement or a combination of the horizontal movement and vertical movement. After the positioning arm 400 is retreated from the operating position above the lower mold 104 to the retreated position, the positioning arm 400 is preheated by an arm preheating apparatus (not shown).

The positioning arm 400 is heated to a preheating temperature determined so that no surface defect of the preform is caused even if the positioning arm 400 is brought into contact with the preform upon correcting the position of the preform as the material to be molded. For example, the preheating temperature falls within the range on the order between Tg−200° C. and Ts+100° C., preferably, between Tg−100 and Ts, where Tg and Ts represent the transition point and the sag point of a glass forming the preform, respectively.

The positioning arm 400 is preferably made of a material having high heat resistance, superior mechanical strength, and low wettability with the glass. For example, a carbon based material is used. As such a carbon based material, high-density carbon or glassy carbon is preferable. It is noted here that the material need not be a single material but may be a composite material such as a combination of a ceramics or a metal base and a thin film deposited on its surface. The thin film may be a carbon based thin film, such as a graphite carbon film, a diamond-like carbon film, and a diamond film and a noble metal film. The thin film may be formed by coating or plating.

Figure 7A:
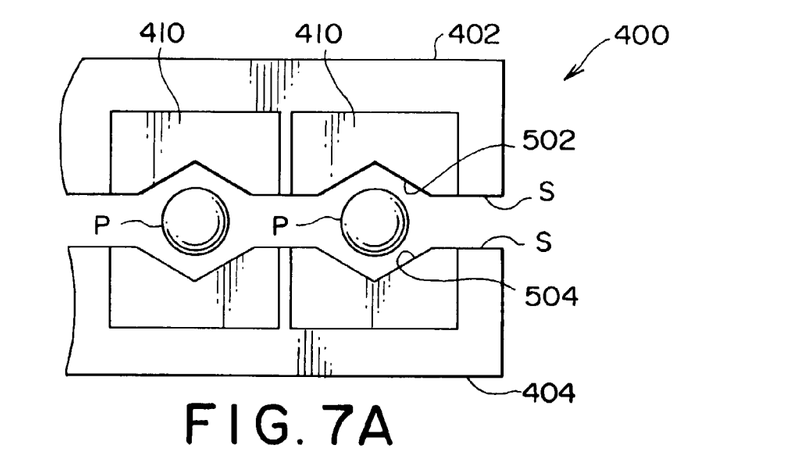
FIGS. 7A through 7C are enlarged views for describing an operation of the positioning arm illustrated in FIG. 6.
Figure 7B:
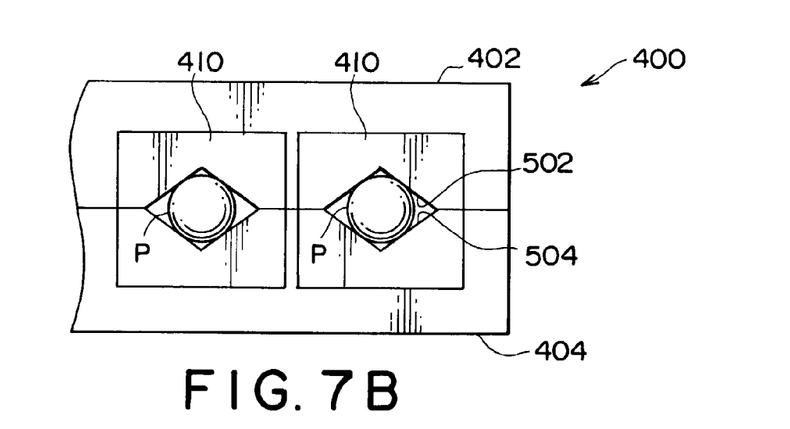

Referring to FIGS. 7A and 7B, the arm split members 402 and 404 of the positioning arm 400 are opened and closed. In the figures, the arm split members 402 and 404 have confronting surfaces as butt or contact surfaces S. The contact surface S of the arm split member 402 is provided with a plurality of positioning surfaces 502 to be brought into contact with the outer peripheries of the preforms (depicted by the symbol P in the figures). Likewise, the contact surface S of the arm split member 404 is provided with a plurality of positioning surfaces 504 to be brought into contact with the outer peripheries of the preforms P. These positioning surfaces 502 and 504 define end surfaces of the above-mentioned opening portions 416.

As illustrated in FIG. 7A, when the arm split members 402 and 404 are opened, each pair of the positioning surfaces 502 and 504 are faced to the outer periphery of each of the preforms P dropped and supplied onto the molding surfaces of the lower mold 104 (FIG. 3). As illustrated in FIG. 7B, when the arm split members 402 and 404 are closed, the positioning surfaces 502 and 504 are brought into contact with the outer periphery of the preform P so as to position the preform P.

Both of the positioning surfaces 502 and 504 are inclined with respect to an opening and closing direction (widthwise direction of the positioning arm 400). Accordingly, each preform P can be positioned in both of the longitudinal direction and the widthwise direction of the positioning arm 400. By the above-mentioned positioning, the center of the preform P is substantially coincident with the center of the molding surface 120 of the lower mold 104 (FIG. 4).

At the operating position (i.e., the position where the positioning blocks 410 corresponds to the molding surfaces 120 of the lower mold 104, respectively), the positioning arm 400, with the arm split members 402 and 404 opened, waits the preforms dropped and supplied. When the preforms are dropped and supplied from the transfer arm 300, the arm split members 402 and 404 are closed and opened in parallel to each other once to several times so that the positioning surface 502 or the positioning surface 504 (or both of the positioning surfaces 502 and 504) are brought into contact with the outer periphery of the preform P. In this manner, the centers of a plurality of the preforms P are simultaneously positioned to be substantially coincident with the centers of the molding surfaces 120 of the lower mold 104.

When the positioning of the preforms is completed, the lower mold 104 moves downward or the positioning arm 400 moves upward so that the preforms are out of contact with the positioning arm 400. Then, the positioning arm 400 is retreated from the operating position above the lower mold 104 to the retreated position. Thereafter, the preforms are press-molded by the press-molding apparatus illustrated in FIG. 3. Specifically, in the press-molding apparatus, the upper mold 102 or the lower mold 104 (or both of the upper and the lower molds 102 and 104) is moved and the preforms are pressed on their molding surfaces. Thus, lenses having a desired lens shape are formed.

Next, description will be made about a method of manufacturing a molded product according to this embodiment of this invention.

In the press-molding apparatus, the upper mold 102 and the lower mold 104 are heated by high-frequency induction heating of the induction heating coils 114 and 116. Successively, the preforms preliminarily formed into the flat spherical shape are transferred by the transfer arm 300, and are simultaneously heated by a heating apparatus (not shown). Preferably, the heating temperature of the preforms is higher than those of the upper mold 102 and the lower mold 104 and corresponds to the viscosity of the preform being smaller than $10^9$ poises. Thereafter, the transfer arm 300 is inserted between the upper mold 102 and the lower mold 104 of the press-molding apparatus.

Successively, the positioning arm 400 is rotated from the retreated position to the operating position above the lower mold 104 to be positioned between the lower mold 104 and the transfer arm 300. As a consequence, the positioning blocks 410 of the positioning arm 400 are faced to the molding surfaces 120 of the lower mold 104, respectively. Then, the lower mold 104 moves upward to a position slightly lower than the lower surface of the positioning arm 400. With the arm split members 402 and 404 opened, the positioning arm 400 waits the preforms dropped and supplied from the transfer arm 300.

When the transfer arm 300 drops and supplies the preforms onto the lower mold 104, each pair of the positioning surfaces 502 and 504 of the arm split members 402 and 404 are faced to the outer periphery of each preform on the lower mold 104. The positioning arm 400 closes and opens the arm split members 402 and 404 once to several times so that the positioning surfaces 502 and 504 are brought into contact with the outer periphery of the preform to bring the preform to the center of the molding surface 120. Thus, the positioning is carried out. In the above-mentioned manner, the centers of the preforms can be simultaneously positioned to be substantially coincident with the centers of the molding surfaces 120 of the lower mold 104.

When the positioning of the preforms is completed, the lower mold 104 moves downward so that the preforms are located below the positioning arm 400. Thereafter, the positioning arm 400 is retreated to the retreated position. After the positioning arm 400 is retreated, the lower main shaft 112 is moved upward and six preforms are pressed between the upper mold 102 and the lower mold 104 to thereby form the lenses having a desired lens shape. After completion of pressing of the preforms by the upper mold 102 and the lower mold 104, the lower main shaft 112 is moved downward so that the upper mold 102 and the lower mold 104 are opened. Successively, six glass optical elements left on the lower mold 104 are sucked and removed by a removing apparatus (not shown). As s consequence, the lenses press-molded with high accuracy can be obtained.

As explained above, according to this embodiment, the positioning arm 400 is opened and closed so that each pair of the positioning surfaces 502 and 504 of the arm split members 402 and 404 are brought into contact with the outer periphery of each preform. In this manner, the preforms can be accurately positioned without causing tilting of the preforms. Furthermore, the positioning arm 400 can be retreated from the operating position above the lower mold 104. Therefore, the heat capacity of the lower mold 104 can be reduced as compared with the structure in which the positioning mechanism is attached to the lower mold 104. This contributes to an increase in temperature elevation rate and cooling rate of the lower mold 104.

The positioning arm 400 has the arm split members 402 and 404 which can be opened and closed. With this structure, a plurality of preforms can be simultaneously and rapidly positioned. Furthermore, the positioning arm 400 is preheated by a heater additionally provided. As a consequence, each of the positioning surfaces 502 and 504 can be kept at an appropriate temperature.

Moreover, according to this invention, at the moment when the contact surfaces S of the split members 402 and 404 are contacted to each other, the positioning surface 502 and/or 504 is brought into contact with the outer periphery of the preform to position the preform. Therefore, the positioning can be carried out only by closing the arm split members 402 and 404. Thus, an opening and closing mechanism of the arm split members 402 and 404 can be simplified.

In addition, the positioning arm 400 is kept out of contact with the lower mold 104. With this structure, no substantial dissipation of heat of the lower mold 104 to the positioning arm 400 is caused to occur. As a consequence, it is possible to control uniform temperature distribution of the lower mold 104. Further, the positioning arm 400 is heated at the retreated position by the arm preheating apparatus. It is therefore possible to preliminary keep the positioning arm 400 at a sufficiently high temperature and to prevent heat of the preforms from being dissipated through the positioning arm 400. In addition, since the arm split members 402 and 404 are opened and closed in parallel to each other, the preforms can be simultaneously positioned under the same conditions.

Figure 7C:
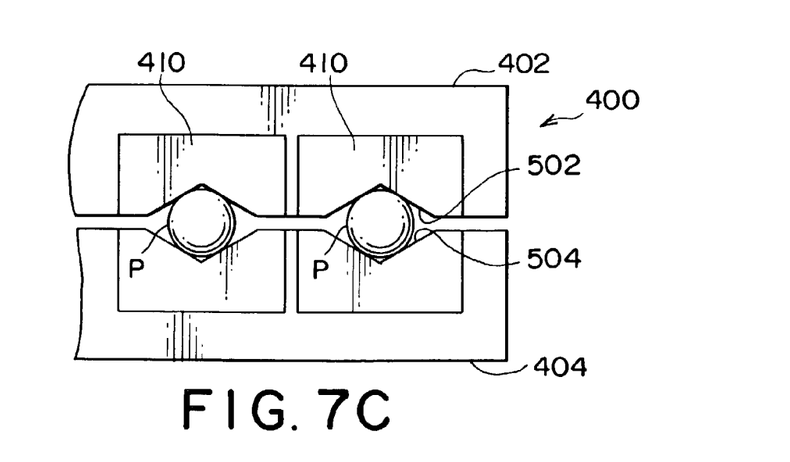

Referring to FIG. 7C, the arm split members 402 and 404 may be brought into contact with the outer periphery of the preforms before the end of its traveling stroke, i.e., before the contact surfaces S of the split members 402 and 404 are contacted to each other. In this event, it is preferable to halt or stop the arm split members 402 and 404 at a position suitable for positioning the preforms. For example, the suitable position is such a position that the centers of the opening portions 416 defined by the positioning surfaces 502 and 504 are substantially coincident with the centers of the molding surfaces 120 and that the positioning surfaces 502 and 504 are brought into contact with the outer peripheries of the preforms.

Next, description will be hereinafter made about specific examples of this embodiment.

Herein, glass preforms having a flat spherical shape and made of lanthanum borate glass were used as the preforms. Each of the upper mold 102 and the lower mold 104 had a plurality of molding surfaces. In detail, each of the upper and the lower molds 102 and 104 had five pressing molds and a mother mold holding these pressing molds. The mother mold was made of a tungsten-based alloy. Each of the pressing molds was formed by a silicon carbide (SiC) sintered body and had a molding surface coated with a silicon carbon film deposited by CVD. The molding surface was further coated with a diamond-like carbon film and/or an i-carbon film. The upper mold 102 and the lower mold 104 were set in a coaxial arrangement. A pressing mold assembly was formed by the upper mold 102, the lower mold 104, and a guide mold (not shown) for guiding the upper and the lower molds 102 and 104 with the coaxial arrangement maintained.

The molding surfaces of each of the upper mold 102 and the lower mold 104 were arranged in a single straight line and were faced to each other so that the molding surfaces of the upper mold 102 were coincident in optical centers with the molding surfaces of the lower mold 104. The heating of the upper mold 102 and the lower mold 104 was carried out by the induction heating coils under control of a mold temperature monitoring thermocouple inserted in the lower mold 104. As described above, the pressing molds made of silicon carbide hardly heated by induction heating were held by the mother mold made of the tungsten-based alloy which can be heated by induction heating. With this structure, the pressing molds and the molding surfaces thereof were heated by heat conduction from the mother mold heated by induction heating. The transfer arm 300 held the preforms in the floating state by injecting 98% $N_2$+2% $H_2$ gas at a flow rate shown in Table 1.

TABLE 1

| Examples | Glass Temperature (° C.) (viscosity in poises) | Floating Flow Rate (l/min) | Mold Temperature at the start of Molding (° C.) (viscosity in poises) | Molding Pressure (kg/cm2) | | Molding Time (sec) | Cooling Rate (° C./min) | Releasing Temperature (° C.) (viscosity in poises) | Evaluation of Glass Molded Product | |
|---|---|---|---|---|---|---|---|---|---|---|
| | | | | Initial Pressure | Secondary Pressure | | | | Surface Accuracy | Surface Condition |
| 1 | 640° C. ($10^{7.5}$ poises) | 1.0 | 605° C. ($10^9$ poises) | 100 | 50 | 70 | 62 | 543° C. ($10^{12.7}$ poises) | ◎ | ◎ |
| 2 | 640° C. ($10^{7.5}$ poises) | 1.0 | 605° C. ($10^9$ poises) | 100 | 50 | 70 | 76 | 529° C. ($10^{13.7}$ poises) | ◎ | ◎ |
| 3 | 640° C. ($10^{7.5}$ poises) | 1.0 | 605° C. ($10^9$ poises) | 100 | 50 | 85 | 71 | 516° C. ($10^{14.7}$ poises) | ○ | ◎ |
| 4 | 640° C. ($10^{7.5}$ poises) | 1.0 | 595° C. ($10^{10}$ poises) | 100 | 50 | 70 | 61 | 534° C. ($10^{13.4}$ poises) | ◎ | ◎ |
| 5 | 640° C. ($10^{7.5}$ poises) | 1.0 | 605° C. ($10^9$ poises) | 100 | 20 | 82 | 72.5 | 518° C. ($10^{14.5}$ poises) | ◎ | ◎ |

After a molding chamber including the press molding apparatus was evacuated to vacuum, the 98% $N_2$+2% $H_2$ gas was introduced so that the molding chamber was kept at an atmosphere of the above-mentioned gas. Thereafter, the upper mold 102 and the lower mold 104 were heated by the induction heating coils and the temperature of the upper mold 102 and the lower mold 104 was measured by the mold temperature monitoring thermocouple. Each of the upper and the lower molds 102 and 104 was heated until the measured temperature reached 605° C. (examples 1–3, 5) or 595° C. (example 4) corresponding to the viscosity of the glass preform being $10^9$ poises and $10^{10}$ poises, respectively. Then, the upper and the lower molds 102 and 104 were kept at the above-mentioned temperature.

At this time, the upper mold 102 and the lower mold 104 were heated in a separated state and, upon molding, coupled into the integral pressing mold assembly together with the above-mentioned guide mold. On the other hand, by the preform heating apparatus (not shown), the preforms on the transfer arm 300 were heated and kept in a furnace which temperature was set at 718° C. corresponding to the glass viscosity of $10^{5.5}$ poises.

At this time, the preforms were floated on the transfer arm 300 by the gas and heated and softened and the preform temperature reached 640° C. Then, the transfer arm 300, with the heated and softened preforms floated and held thereon, was rapidly moved to a position immediately above the lower mold 104. At that position, the preforms were simultaneously dropped and supplied onto the molding surfaces 120 of the lower mold 104. At this time, the positioning blocks 410 of the positioning arm 400 were placed immediately above the lower mold 104 to simultaneously position the dropped and supplied preforms with respect to the molding surfaces 120 of the lower mold 104, as mentioned above.

Thereafter, the positioning arm 400 was retreated from the operating position above the lower mold 104. Then, the preforms were press-molded under a pressure of 100 kg/cm$^2$ for 10 seconds to produce glass molded products having a desired thickness. Thereafter, the pressure was rapidly reduced to 50 kg/cm$^2$. At the same time, the glass molded products and the pressing molds were kept at the above-mentioned pressure and cooled by deenergizing the induction heating coils. The temperature of each of the upper mold 102 and the lower mold 104 was measured by the mold temperature monitoring thermocouple after lapse of a time period depicted by a molding time (initial pressing time (10 seconds)+secondary pressing time) in Table 1. When the measured temperature reached a temperature corresponding to the viscosity shown as the releasing temperature in Table 1, the glass molded products were released and removed from the pressing mold.

The glass molded products thus obtained (biconvex lenses having an outer diameter φ of 18 mm, a thickness of 2.9 mm, an edge thickness of 1.0 mm) were evaluated for performance after annealing. Specifically, evaluation was made about a surface accuracy measured by an interferometer and a surface condition judged by visual observation and a stereo microscope. The results are shown in Table 1. The evaluation was carried out for five lenses obtained in the same manner. Table 1 shows the evaluation result for the glass molded products obtained at different mold temperatures and different releasing temperatures. As a result, each of the molded products (lenses) was excellent. Furthermore, each of the five lenses thus obtained had an excellent shape without the thickness deviation.

Thus, description has been made about one embodiment of this invention with reference to the drawings. However, it will readily be understood that this invention is not restricted to the foregoing description in conjunction with the embodiment but encompasses a number of modifications and variations within the scope of the appended claims and that this invention may be practiced in various other manners. For example, the number of the positioning blocks in the positioning arm 400 may be any desired number not smaller than two. Furthermore, the opening portion 416 of the positioning block 410 may have any desired shape as far as the preforms can be positioned.

As described above, this invention provides a press molding apparatus which is for obtaining a plurality of optical elements by simultaneously press molding a plurality of materials in a heated and softened state by a plurality of preheated molding surfaces formed on each of an upper mold and a lower mold and which has a supply unit, a position correcting unit, and a press molding unit.

The molding surfaces of each of the upper and the lower molds are arranged so that the centers of the molding surfaces are aligned in a single line.

The supply unit supplies the materials onto the molding surfaces, respectively.

The position correcting unit is composed of a pair of split members symmetrical with each other with respect to the line of the centers of the molding surfaces and adapted to be opened and closed in parallel to each other. The split members have a plurality of positioning surfaces formed on their contact surfaces to be brought into contact with outer peripheries of the materials. The split members are moved towards a closing position so that the materials supplied onto the molding surfaces are moved to the centers of the molding surfaces, respectively.

The press-molding unit simultaneously press-molds the materials, corrected in position, by the upper mold and the lower mold.

With the above-mentioned structure, a plurality of materials can be simultaneously supplied onto the molding surfaces, simultaneously corrected in position, and simultaneously press-molded. Thus, a plurality of materials to be simultaneously press-molded can be kept under the same molding conditions. Therefore, not only the thickness deviation can be avoided but also the materials to be simultaneously press-molded can be molded into optical elements excellent in surface accuracy, if an optimum molding condition is selected.

In case where press molding is carried out after the heated and softened glass preform is supplied onto the molding surface of the pressing mold preheated to a temperature lower than that of the heated and softened glass preform, cooling of the glass preform is started at the time of contacting with the pressing mold and at the contacting portion. In this case, the effect of this invention is remarkable. The effect is that the glass preforms can be kept under the same molding conditions because the preforms are simultaneously supplied onto the molding surfaces, simultaneously corrected in position, and simultaneously press-molded.

Moreover, only a short time period is required after the supply of the glass preforms onto the molding surfaces and before the start of the press-molding. This also contributes to an improvement in surface accuracy. The glass preform is heated and softened to the viscosity at which the glass preform is readily deformed, for example, to the viscosity not greater than 10$^9$ poises, and is thereafter supplied onto the molding surface. In case where the glass preform is held in a floating state in order to prevent the surface defect of the glass preform and is then dropped and supplied, it is difficult to control the supply position of the glass preform. Even in such an event, a plurality of glass preforms are simultaneously and accurately corrected in position according to this invention. Therefore, the above-mentioned effect can be achieved without causing thickness deviation.

Further, even if the glass preform has a shape (for example, a flat spherical shape) other than a shape (for example, a spherical shape) such that the preform itself rolls down to the center of the molding surface after it is supplied to the molding surface or even if the glass preform is heated and softened to a viscosity (for example, smaller than 10$^9$ poises) such that the glass is flattened and deformed on the molding surface, a plurality of glass preforms are simultaneously and accurately corrected in position. Therefore, the above-mentioned effect can be achieved without causing thickness deviation.

Moreover, according to this invention, the molding surfaces are arranged in a single straight line and the position-correcting unit can be arranged in the similar manner. Therefore, the positioning operation can be achieved with a very simple operation of opening and closing the two split members. This results in an advantage of a simplified structure of the apparatus.

In addition, a plurality of materials are held on the holding portion of the supplying unit in a single straight line.

Therefore, the materials can be simultaneously dropped and supplied merely by splitting the holding portion in parallel. This makes it unnecessary to provide a suction pad which is generally used when a plurality of materials are simultaneously supplied. As a consequence, even if the material to be molded is a glass preform heated and softened to a low viscosity smaller than $10^9$ poises, it is possible to prevent the material from occurrence of the surface defect (resulting from the contact with the suction pad).

What is claimed is:

1. A press-molding apparatus for obtaining a plurality of optical elements by simultaneously press molding a plurality of materials comprising:
   an upper mold and a lower mold, each of said upper mold and said lower mold comprising a plurality of molding surfaces arranged so that the centers of the molding surfaces on each of said upper and said lower molds are aligned in a single line;
   a supply device for supplying each of the materials onto each of the molding surfaces of the lower mold; and
   a position correcting device for correcting the positions of the materials supplied onto the molding surfaces of the lower mold;
   wherein the position correcting device comprises a pair of separate members adapted to be opened and closed with each other, so that a positioning surface formed on each confronting surface of the pair of separate members be brought into contact with outer peripheries of the materials on the lower mold and move the materials so that each of said materials is placed on the center of each molding surface, when the separate members are closed.

2. The press molding apparatus of claim 1, wherein
   the supply device comprises a plurality of holding portions for holding the materials, said holding portions being arranged in a single line,
   wherein the supply device is capable of dropping each of the materials simultaneously onto each molding surface of the lower mold by dividing each of the holding portions into two along the single line.

3. The press molding apparatus of claim 2, wherein
   the holding portions have a structure such that the materials are floated by gas thereon and are dropped onto the molding surfaces when the holding portions are divided along said single line.

4. The press molding apparatus of claim 1, further comprising a heater for preheating the position correcting device.

5. The press molding apparatus of claim 1, wherein the position correcting device is adapted to move from a preheating position where the device is preheated by the heater to an operating position above the molding surfaces where the device is operated to correct the positions of the materials.

6. The press molding apparatus of claim 1 wherein the position correcting device has no contact with the molding surface.

7. The press molding apparatus of claim 1 wherein each of the pair of separate members have a plurality of V-formed faces on a positioning surface.

8. A method of manufacturing a plurality of optical elements by simultaneously press molding a plurality of materials in a heated and softened state by a plurality of preheated molding surfaces, the method comprising the steps of:
   simultaneously supplying each of said plurality of materials heated and softened onto each molding surface;
   simultaneously correcting the position of each of the materials supplied onto each molding surface; and
   simultaneously press molding each material with the molding surfaces,
   wherein said simultaneously correcting step is carried out by a pair of separate members of a position correcting device, said members being adapted to be opened and closed with respect to each other so that a positioning surface formed on each confronting surface of the separate members can be brought into contact with outer peripheries of the materials and can move the materials toward the center of each molding surface when the separate members are closed, said positioning surface being preheated to a predetermined temperature.

9. The method of claim 8, wherein:
   the material is a glass material and is heated to a temperature higher than that of the preheated molding surface prior to being supplied onto the molding surface.

10. The method of claim 9, wherein each of the materials is supplied onto the each molding surface by dropping.

11. The method of claim 10, wherein the glass material is heated and softened to a viscosity smaller than $10^9$ poises.

12. The method of claim 10, wherein the each material is a preform having a spherical shape or a flat spherical shape.

13. The method of claim 12, wherein the position correcting device is retreated from an operating position above the molding surfaces where the correcting is carried out to a preheating position after the correcting up to the correcting of the next supplied materials.

14. The method of claim 8, wherein the molding surfaces are arranged in a single straight line on each of upper and lower mold.

15. The method of claim 8, wherein the molding surfaces are arranged in a single straight line, each of the heated and softened materials is a glass material and is supplied onto the molding surface after the material is heated to a temperature higher than that of the preheated molding surface.

16. The method of claim 14 wherein the correcting is carried out with the position correcting device being in contact with the lower mold.

17. The method of claim 8 wherein the correcting is carried out such that confronting surfaces of the pair of the separate members do not contact with each other.

18. The method of claim 8 wherein said members are stopped at a predetermined position in the course of closing.

19. A method of manufacturing a plurality of optical elements by simultaneously press molding a plurality of materials in a heated and softened state by a plurality of preheated molding surfaces, the method comprising the steps of:
   simultaneously supplying each of said plurality of materials heated and softened onto each of the molding surfaces, which molding surfaces are aligned in a single line;
   simultaneously correcting the position of each of the materials supplied onto each molding surface; and
   simultaneously press molding each of the materials with the molding surfaces,
   wherein said correcting is carried out by a pair of separate members of a position correcting device, said members are adapted to be opened and closed with each other so that a positioning surface formed on each confronting surface of the separate members be brought into contact with outer peripheries of the materials and move the materials so that each of said materials is placed on the center of each molding surface when the separate members are closed.

20. The method of claim 19 wherein said members are stopped at a predetermined position in the course of closing.

21. A method of manufacturing optical elements by press molding materials in heated and softened state by molding surfaces, the method comprising the steps of:
supplying the material in heated and softened state onto the preheated molding surface;
correcting the position of the material supplied onto the molding surface by moving the material towards center of the molding surface; and
press molding the material with the molding surface,
wherein said correcting is carried out by a pair of separate members of a position correcting device, said members are adapted to be opened and closed with each other, so that a positioning surface formed on each confronting surface of the separate members be brought into contact with outer peripheries of the material and move the material toward the center of the molding surface when the separate members are closed, said positioning surface being preheated to a predetermined temperature when said correcting is carried out and being retreated from an operating position above the molding surfaces to a preheating position when the correcting is not carried out.

22. The method of claim 21 wherein the correcting is carried out with the position correcting device being in contact with the lower mold.

23. A method of manufacturing a plurality of optical elements by simultaneously press molding a plurality of materials in a heated and softened state by a plurality of heated molding surfaces, the method comprising the steps of:
supplying each of said plurality of materials onto each of the molding surfaces, which molding surfaces are aligned in a single line;
simultaneously correcting the position of each of the materials supplied onto each molding surface; and
simultaneously press molding the each of the materials with the molding surfaces, wherein said correcting is carried out by a pair of separate members of a position correcting device, said members are adapted to be opened and closed with each other so that a positioning surface formed on each confronting surface of the separate members be brought into contact with outer peripheries of the materials and move the materials so that each of said materials is placed on the center of each molding surface when the separate members are closed.

24. The method of claim 23 wherein said members are stopped at a predetermined position in the course of closing.

* * * * *